United States Patent [19]

Walle

[11] 4,157,656
[45] Jun. 12, 1979

[54] LEAK DETECTION SYSTEM

[76] Inventor: L. Irwin Walle, 1841 N. Hercules Ave., Clearwater, Fla. 33515

[21] Appl. No.: 857,005

[22] Filed: Dec. 2, 1977

[51] Int. Cl.$^2$ ............................................. G01M 3/32
[52] U.S. Cl. .................................................... 73/49.2
[58] Field of Search ................ 73/49.2, 49.3, 40, 715, 73/716; 137/804

[56] References Cited

U.S. PATENT DOCUMENTS

| 2,855,777 | 10/1958 | Garrett ..................................... 73/40 |
| 3,717,037 | 2/1973 | Buddecke ............................ 73/715 |
| 4,012,945 | 3/1977 | Bergstrand ........................... 73/49.2 |

Primary Examiner—Charles A. Ruehl
Assistant Examiner—Joseph W. Roskos
Attorney, Agent, or Firm—Stanley M. Miller

[57] ABSTRACT

A system is disclosed for detecting the leakage of fluid from a container by measuring the decay of an initial pressure input. The system employs an axially displaceable piston having a first surface exposed to fluid pressure within the container, and a second surface opposed to the first surface, having a first portion exposed to a reference gas pressure, and a second portion not so exposed. A gas jet has an inlet connected to a pressure sensing source and a sensing gas pressure detector with an outlet proximate to the second portion of the second surface of the piston. Changes in the relative magnitude of the fluid pressure within the container with respect to the reference gas pressure will cause the piston to alternately block and unblock the outlet of the gas jet, producing a low pressure gas signal. This device is termed the "monitor". A pneumatic signal amplifier is connected between the gas jet and the signalling device, having a compound valve mechanism which sets a threshold below which low level noise pressure fluctuations in the sensing gas pressure will be ignored, but above which valid sensing pressures will cause an abrupt output high pressure signal to be generated. The valving action also causes an abrupt discontinuation of the signal immediately below the threshold set. This device is termed the "amplifier". Several embodiments of the invention are described.

17 Claims, 11 Drawing Figures

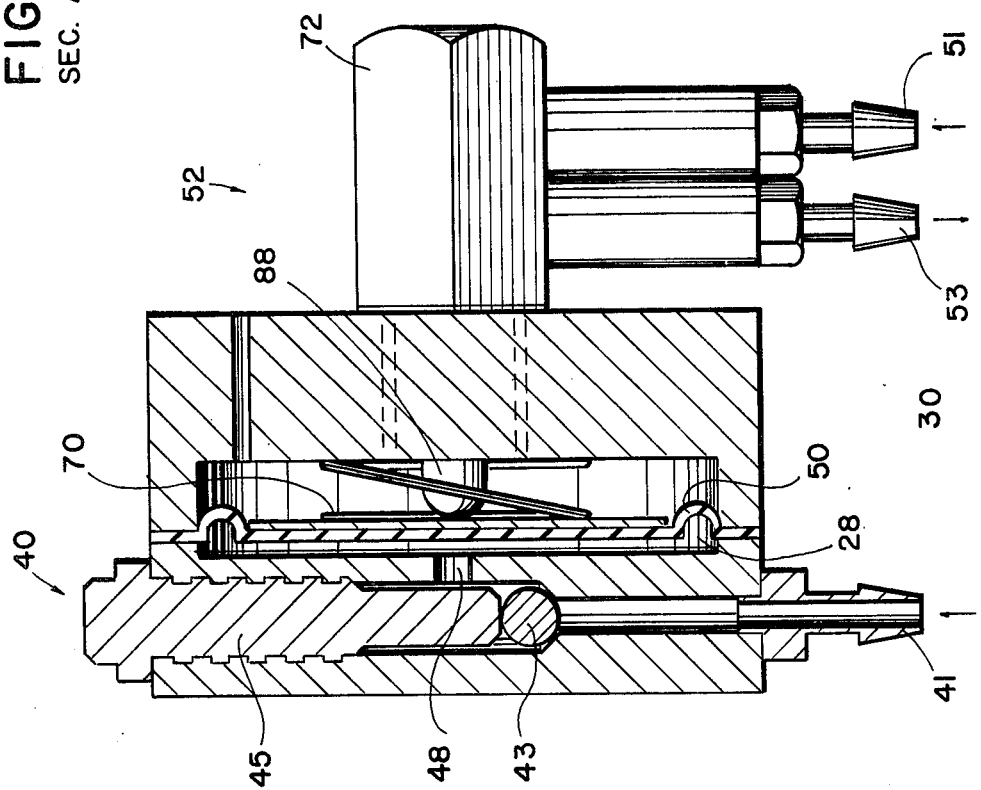
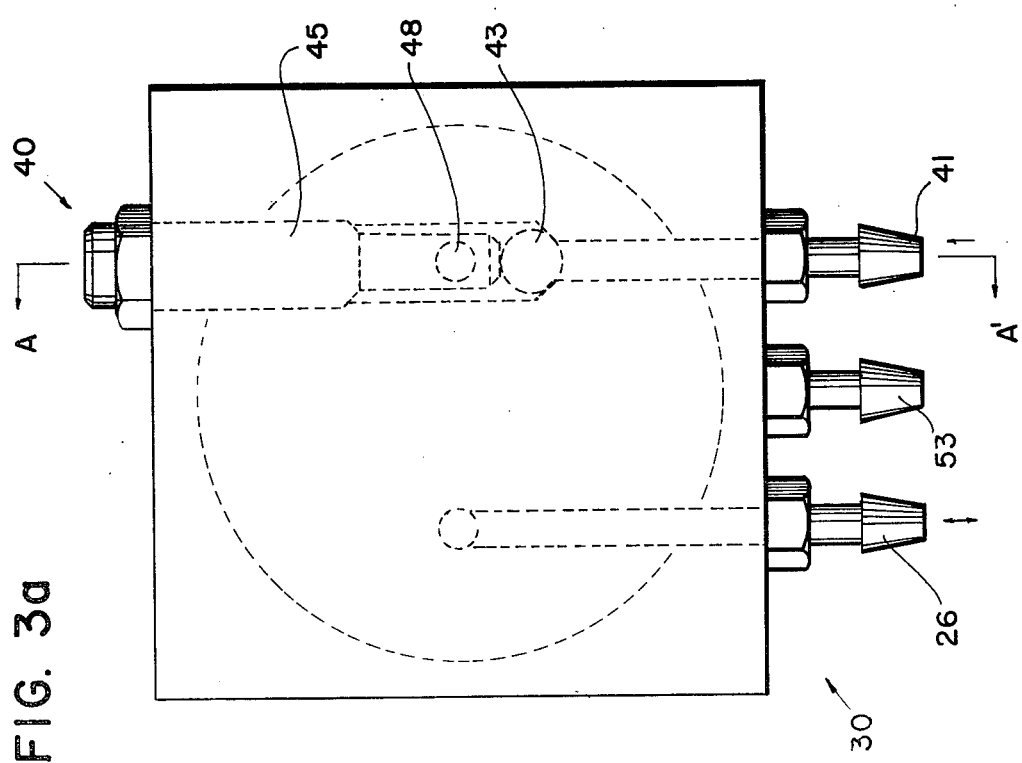
FIG. 3a
FIG. 3b
SEC. A-A'

SEC. B-B'

LEAK DETECTION SYSTEM

FIELD OF THE INVENTION

The invention disclosed broadly relates to measurement apparatus and more particularly relates to automatic leak detection apparatus.

BACKGROUND OF THE INVENTION

Prior art mechanical pressure sensors used in industry to recognize a decay in pressure are usually in one of three forms, a Burdon tube, a corrugated diaphragm or diaphragm capsule, or a bellows. The Burdon gauge is one in which the pressure is indicated directly by an attached pointed and scale. The Burdon tube is elliptical or flattened in cross section and bent into a circular form. One end is soldered to a central block through which the fluid enters and the other end is sealed and coupled by a link to a pivoted quadrant with teeth meshing with those of a pinion on the pointer spindle. An increase of pressure within the tube tends to change its cross section from elliptical to circular and the tube consequently uncoils slightly, thus turning the pointer. The movement of the pointer may be detected electronically to record established pressures.

Another direct-reading gauge utilitzes as the elastic pressure-sensitive element a hollow sealed disc-shaped capsule made from corrugated metal diaphragms. Changes in pressure cause motion of the center of the capsule and this motion is amplified by a mechanical linkage to control movement of the pointer over a calibrated dial. In order to distinquish changes in pressure, two of these gauges are used, one to establish the initial pressure, the other to recognize the differential from initial pressure. The two gauges may be housed in one container.

Thirdly, diaphragms or bellows may be used to actuate valves or switches when a preset pressure is attained. Such actuators must provide sufficient movement to cause actuation, either by direct movement or mechanical linkage. While they are extremely accurate in recording the achievement of the required pressure, they are slow in recognizing the decay of pressure.

Each of these prior art industrial sensors have been designed specifically to respond to an increase in pressure and have a "dead band" between the magnitude of pressure sensed and the decay in pressure before recognizing the change in pressure. A significant defect is that they require calibration against known pressures measured by liquid column instruments, such as the manometer or barometer, and have no compensating ability to contend with test pressure fluctuations. In consequence their ability to detect leakage is dependent on precise pressure control, and the response is too slow to distinquish subtle changes in pressure at industrial production speed requirements.

Another method of detecting leakage is by the use of a double-rod end cylinder which acts as a pump to fill the vessel being tested, and brining an air-jet or other signalling device into contact with the piston rod opposite to the pump. The air jet is then held stationary and any leakage in the vessel being tested will cause the piston to move away from the jet, releasing it and causing a signal to be emitted. This system is used when intensification of pressure is required for the test procedure. It can only be used for hydrostatic testing at medium or high pressures and is extremely slow in operation.

The most common industrial technique for detecting leakage is to charge a vessel with pressurized air and immerse it in a liquid and observe whether bubbles are emitted from the vessel walls. This time consuming technique can present impediment to the throughput of a production process and the quality of the test is strongly dependent upon the skill of the operator.

OBJECTS OF THE INVENTION

It is therefore an object of the invention to provide an improved go-no-go test for detecting the decay of fluid pressure.

It is another object of the invention to provide an improved fluid pressure testing technique which is easy to set up and requires little operator skill.

It is still a further object of the invention to provide an improved self-calibrating pressure sensing system.

It is yet another object of the invention to provide an improved technique for detecting leakage in pressurized vessels.

SUMMARY OF THE INVENTION

These and other objects, features, and advantages of the invention are provided by the leak detection system disclosed herein.

A system for detecting the leakage of fluid from a container is disclosed which employs an axially displaceable piston having a first surface exposed to a fluid pressure to be monitored and a second surface opposite to the first surface, having a first portion exposed to a reference gas pressure, and a second portion not so exposed. A gas jet has an inlet connected to a sensing gas pressure source and a sensing gas pressure detector with an outlet which is proximate to the second surface of the piston. Changes in the relative magnitude surface of the piston with respect to the preference gas pressure, will cause the piston to alternately block and unblock the outlet of the gas jet producing low pressure gas signals. A pneumatic amplifier is connected between the gas jet and the signalling device, having a compound valve mechanism which sets a threshold below which low level noise pressure fluctuations in the sensing gas pressure will be ignored, but above which valid sensing pressure signals will cause an abrupt signal to be generated. The valve mechanism also causes an abrupt discontinuation of the signal immediately below the threshold set. Several embodiments of the invention are described.

DESCRIPTION OF THE FIGURES:

These and other objects, features, and advantages will be more particularly appreciated with reference to the accompanying figures.

FIG. 3a is an end view of the pneumatic signal amplifier employed in the inventive system.

FIG. 3b is a cross sectional, side view along the section A—A' of the amplifier shown in FIG. 3a.

Figure 1:
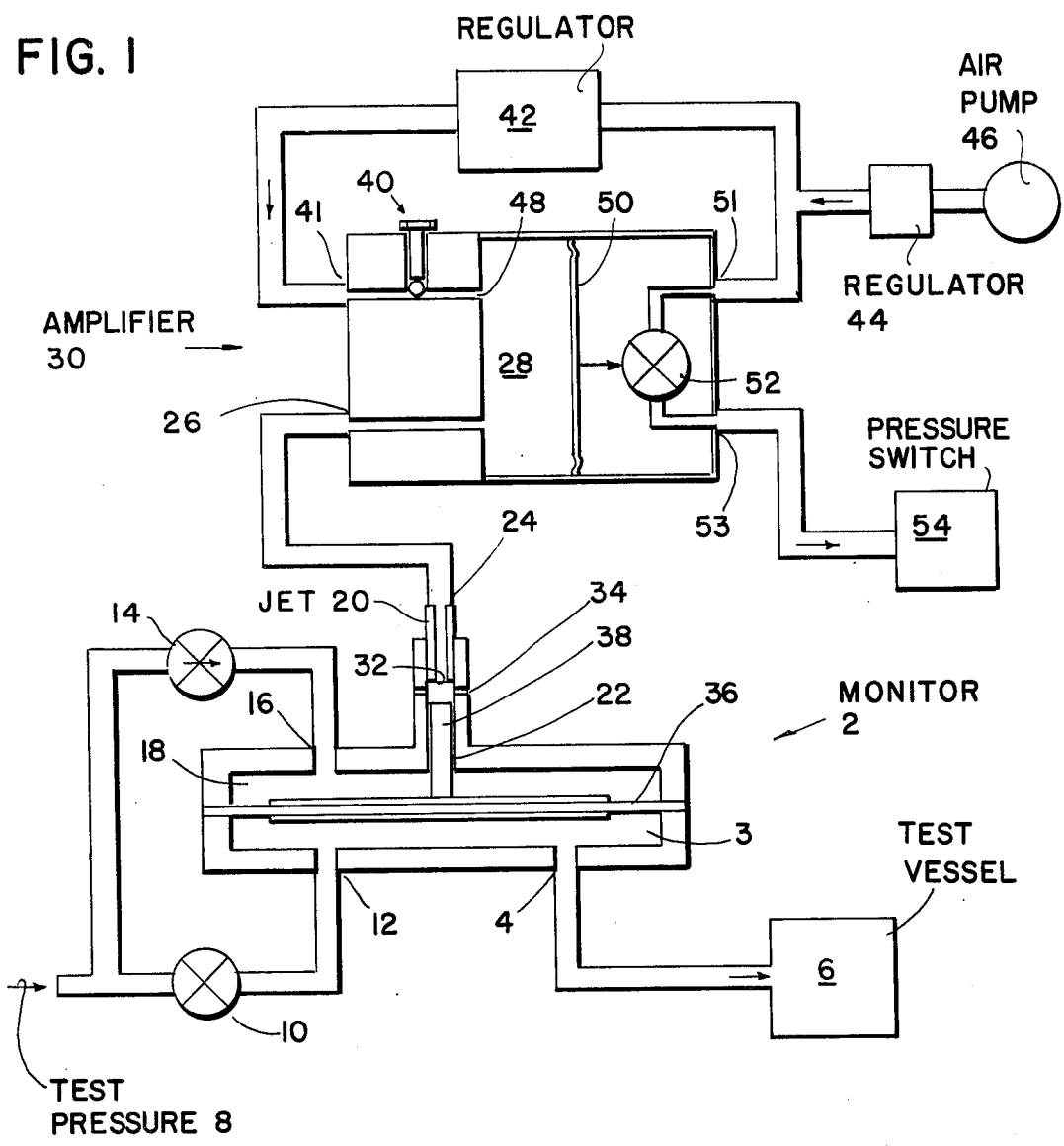
FIG. 1 is a schematic diagram of the leak detection system disclosed herein.

DISCUSSION OF THE PREFERRED EMBODIMENT:

A schematic diagram of the system for detecting leakage is shown in FIG. 1. The monitor 2 has a lower chamber 3 connected through a test gas pressure port 4 to a vessel 6 whose pressure is to be monitored. The test gas pressure is supplied from a source 8 through the charging valve 10 into a second test fluid pressure port 12 in the chamber 3. The test gas pressure source 8 is also connected through the check valve 14 and through the reference gas pressure port 16 to the upper chamber 18 of the monitor 2. These connections enable a pressure drop test to be performed on the test vessel 6.

A jet tube 20 is mounted over a hole 22 in the upper chamber 18 of the monitor 2 and has an inlet 24 connected to the outlet 26 of a sensing chamber 28 in the pneumatic amplifier 30. The jet tube has an outlet 32 facing the interior of the monitor 2 and a vent 34 permits the venting of sensing gas passing through the jet tube 20, to the ambient.

The monitor 2 has its upper chamber 18 and its lower chamber 3 separated by a flexible diaphragm 36 which has a smaller surface area exposed to the upper chamber 18 than it has exposed to the lower chamber 3. A striker 38 is mounted to the diaphragm 36 and extends through the hole 22 in the upper chamber 18 so as to abut with the outlet 32 of the jet tube 20 when the diaphragm is distended into the volume of the upper chamber 18. This condition occurs when the monitored fluid pressure in the lower chamber 3 approximately equals the reference fluid pressure in the upper chamber 18. When this occurs, the flow of sensing gas in the jet tube 20 and out of the outlet 32 is stopped and this condition is sensed in the sensing chamber 28 of the amplifier 30. In the standard pressure drop test in which the monitor 2 is connected in FIG. 1, if the test vessel 6 has a pressure leak, the pressure of the fluid in the lower chamber 3 of the monitor 2 will decrease when the valve 10 is closed, with respect to the pressure of the reference fluid in the upper chamber 18 which is maintained by the check valve 14. Under this condition the diaphragm 36 will relax, withdrawing the striker 38 from blocking the outlet 32 of the jet tube 20. When this condition occurs, the sensing gas will once again flow through the jet tube 20 and this state can be detected in the sensing chamber 28 of the amplifier 30.

The pneumatic amplifier 30 includes a sensing gas flow restrictor 40 having an inlet connected through a senser regulator 42 and system regulator 44 to a pressurized source of gas such as the air pump 46. The sensing gas flow restrictor 40 has an outlet 48 connected to the inlet of the sensing chamber 28. The sensing chamber 28 has one wall formed by a flexible piston 50 and the sensing chamber has the outlet 26 which is connected to the jet tube 20.

A compound valve mechanism 52, which will be discussed later in greater detail with respect to FIGS. 3a through 3d, translates motion in the flexible piston 50 due to variations in the sensing pressure which occur in the sensing chamber 28, into fast rise-time and drop-out pulses of signal gas to the pressure switch 54, from gas supplied from the system regulator 44.

Thus the operation of the system of FIG. 1 is as follows. When the pressure of the test gas in the lower chamber 3 of the monitor 2 is less than the pressure of the reference gas in the upper chamber 18, the diaphragm 36 is relaxed or drawn into the volume of the lower chamber 3 thereby withdrawing the striker 38 from the outlet 32 of the jet tube 20, thereby allowing sensing gas to flow therethrough, as supplied from the outlet 26 of the amplifier 30. The restrictor 40 reduces the pressure of the sensing gas flowing from the senser regulator 42 into the sensing chamber 28 of the amplifier 30 and that relatively low pressure for the sensing gas withdraws the flexible piston 50 from the valve 52 and the valve 52 remains closed, preventing signal gas from the system regulator 44 to pass through the valve 52 to the pressure switch 54. When the pressure of the test gas in the lower chamber 3 of the monitor 2 is increased as to equal or exceed the pressure of the reference gas in the upper chamber 18, such as when the charging valve 10 is opened allowing the test pressure source to fill the test vessel 6 with gas for a pressure drop leak checking test, the diaphragm 36 will be distended into the volume of the upper chamber 18, thereby forcing the striker 38 into abutting engagement with the outlet 32 of the jet tube 20, thereby stopping the flow of sensing gas. When the flow of the sensing gas is stopped through the jet 20 it is also stopped through the sensing gas chamber 28 of the amplifier 30, but the sensing gas at the higher pressure from the sensor regulator 42 continues to flow through the restrictor 40 raising the pressure within the sensing chamber 28 until it reaches the pressure of the gas coming out of the sensor regulator 42. The increased pressure of the sensing gas in the sensing chamber 28 distends the flexible piston 50 so that it engages the valve 52 and actuates it to abruptly open a passage between the signal gas in the system regulator 44 and the pressure switch 54. In this manner, the condition of having achieved a test pressure for the test fluid in the vessel 6 which is at least equal to the pressure of the reference fluid in the upper chamber 18 of the monitor, is detected by the pressure switch 54. In the final stage of the pressure drop test for checking the test vessel 6, the charging valve 10 is turned off and if there is a pressure leak in the test vessel 6, the pressure of the fluid in the lower chamber 3 of the monitor 2 will slowly decrease. When the pressure of the fluid in the lower chamber 3 is less than the reference pressure in the upper chamber 18, the diaphragm 36 once again relaxes withdrawing the striker 38 from the outlet 32 of the jet 20, enabling sensing gas to once again flow therethrough. This condition immediately reduces the pressure of the sensing gas in the sensing chamber 28 of the amplifier 30, causing the flexible piston 50 to withdraw from the valve 52 so that the valve 52 abruptly closes, cutting off and exhausting the signal pressure from the system regulator 44 to the pressure switch 54. Thus the condition of a pressure leak in the test vessel 6 after the expiration of a given period of time, can be sensed by the monitor system of FIG. 1, as connected for a pressure drop test when gas is used as the test medium.

Figure 2:
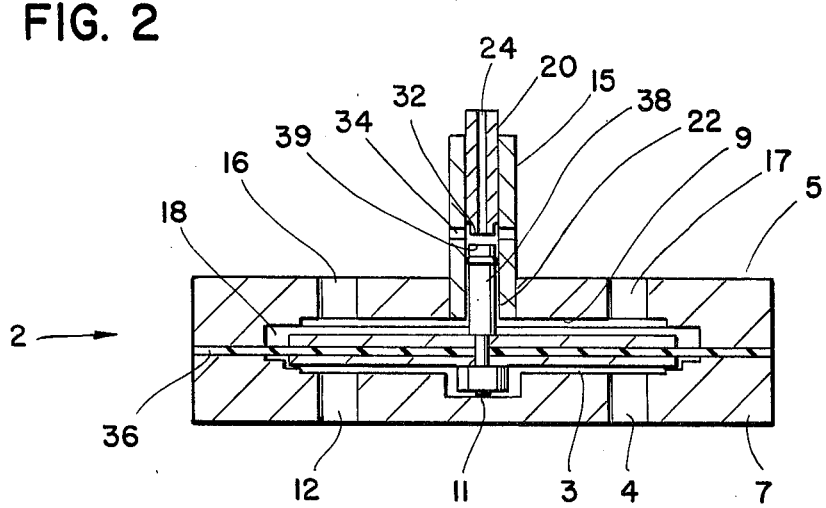
FIG. 2 is a cross sectional view of the first embodiment of the self-calibrating pressure monitor disclosed herein.

FIG. 2 is a more detailed view of the monitor 2. The fluid pressure monitor includes a housing having an upper member 5 and a lower member 7 which are substantially circular in shape with a central portion 9 of the upper member 5 and a central portion 11 of the lower member 7 on the proximate sides thereof, being hollow. The upper housing member 5 has a central hole 22 therethrough which is coaxial with the circular shape and it also has a balance fluid pressure port 16 which can be connected to a source 8 of reference fluid pressure. The lower housing member 7 has a test fluid pressure port 12 and a test vessel pressure port 4. A substantially circular diaphragm 36 is clamped around its periphery between the proximate sides of the upper housing member 5 and lower housing member 7, forming an upper fluid chamber 18 with the upper housing member 5 and a lower fluid chamber 3 with the lower housing member 7. The diaphragm 36 has a smaller portion of its surface area exposed to the reference fluid pressure in the upper chamber 18 than is the cross sectional area of its lower surface which is exposed to the fluid pressure in the lower chamber 3. This is because of the area taken up by the striker piston 38 which is mounted on the top side of the diaphragm 36. In its preferred embodiment, the monitor 2 has the upper surface of the diaphragm 36 exposing approximately one percent less of its surface area in the upper chamber 18 than its surface area exposed by the lower side of the diaphragm 36 to the lower chamber 3.

A hollow barrel member 15 is mounted on the upper side of the upper housing member 5 opposite to the hollow portion 9 thereof and coaxially with the central hole 22. The hollow barrel member 15 has a gas exit port 34 in its side. A gas jet tube 20 is mounted in the hollow barrel member 15 coaxially with the central hole 22. The gas jet tube 20 has a gas jet port 24 which is connected to a source of sensing gas pressure 42 and a sensing gas pressure detector 54. The gas jet tube 20 has a gas outlet 32 on a planar surface thereof which is proximate to the gas exit port 34 in the barrel 15.

A striker piston 38 is mounted coaxially on the diaphragm 36 and in sliding engagement with the central hole 32 of the upper housing member 5 and the inner surface of the barrel member 15. The striker piston 38 has an upper planar surface 39 which mates with and forms a gas seal with the planar surface of the gas outlet 32 of the gas jet port, thereby generating a first state sensing gas pressure signal for detection by the detector 54 when the fluid pressure to be monitored in the lower fluid chamber 3 approximately equals the reference gas pressure in the upper gas chamber 18. The upper planar surface 39 of the striker piston 38 will be displaced from the planar surface 32 of the gas jet port breaking the gas seal therewith, thereby generating a second state sensing gas pressure signal for detection by the detector 54 when the fluid pressure to be monitored in the lower fluid chamber 3 is less than the reference gas pressure in the upper chamber 18.

The fluid to be monitored can be either a gas or a liquid and air, water, or other liquids and gases can have their pressures measured by the monitor 2. The reference pressure and pressure to be monitored can either be a positive pressure or a vacuum.

The monitor 2 functions simply by the application of the balancing gas pressure in a chamber 18 to the one side of the diaphragm 36 which moves the striker piston 38 away from the jet 20 and releases the signal in the sensing gas pressure, then overcoming the balance pressure with the fluid pressure to be monitored in the chamber 3 on the other side of the diaphragm 36. This moves the striker psiton 38 to contact the jet 20 and initiate the signal in the sensing gas, which will remain in effect for as long as the test pressure in the chamber 3 can overcome the balancing pressure in the chamber 15. A significant feature in the monitor 2 is the difference between the effective cross sectional area of the upper surface of the diaphragm 36 with respect to that of its lower surface. The surface area of the diaphragm exposed to the upper chamber 18 is approximately one percent less than that of the lower surface exposed to the lower chamber 3. This permits the same gas pressure to be applied to both sides of the diaphragm 36 so that the monitor 2 is self-calibrating, there being no need to introduce a standardized reference pressure to the upper chamber 18. By admitting the same pressure to both the upper chamber 18 and the lower chamber 3, the diaphragm will distend up into the volume of the upper chamber 18 and will close the jet and initiate a signal which will remain in effect until the pressure on the lower chamber 3 drops below one percent of the initial value. If, upon filling the upper and lower chambers, the pressure in the lower chamber fails to build up to within one percent of that in the upper chamber, the jet contact will not close and no signal will be initiated. The monitor 2 will function on a pressure differential of 0.08 lbs. per square inch gauge and requires a 0.2 ccs volumetric displacement to initiate a signal. The diaphragm which acts as the piston seal, has a direct influence on the pressure differential required to move the striker piston 38. The higher the test pressure in the chamber 3, the more robust the diaphragm material must be, and the greater its resistance to movement. In the preferred embodiment of the monitor 2, a diaphragm suitable for pressures from between 2 and 100 psig can be provided. Different diaphragms may be used for higher and lower pressures, and these are necessarily restricted in the pressures that they will stand or at which they will react. Special diaphragms for unusual conditions or media may also be used.

An important feature of the monitor 2 is that a single source of gas pressure may be used for both the testing pressure introduced to the lower chamber 3 and the balancing pressure introduced in the upper chamber 18, and the monitor will automatically self-calibrate itself to that pressure. In industrial conditions it is extremely difficult to maintain an absolute pressure level and a pressure switch which is dependent upon a mechanical action for balance must be set to react to the lowest pressure level or it will reject good tested parts merely because of source pressure fluctuations. When the pressure peaks, the entire characteristics of the test can be changed as both the pressure differential and the volumetric displacement are effected. Due to the positive positioning of the striker piston in the monitor 2, the volumetric displacment is never changed regardless of changes in the source of the fluid pressure, and therefore an increase in the pressure from the source only results in an increase of the balancing force across the diaphragm 36.

There are many ways to connect the pressure monitor 2 to measure pressure vessel leakage, fluid flow rates, etc. FIG. 1 illustrated how the system may be connected to perform a pressure drop test for leakage of a pressurized vessel. In that test, the pressure vessel is filled with a gas under pressure and then the pressurized supply is shut off and the pressure drop over a period of time is sensed which can be related to a degree of pressure leakage for the vessel.

Figure 4:
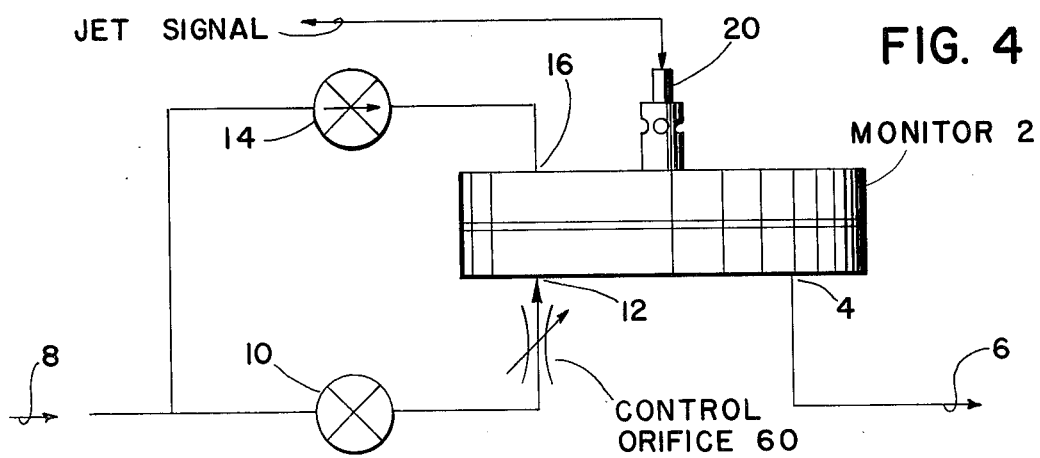
FIG. 4 is a schematic diagram of connections to the monitor for an achieved pressure test.

Another conventional method for conducting a leak test is by charging a vessel to be tested with a pressure at the same rate as any leakage which is expected by the vessel. The system connection for this is shown in FIG. 4 and is called an achieved pressure test. In an achieved pressure test, the pressure will not build up to the required pressure if excessive leakage occurs. This type of test is used when the test vessel is porous but must restrain a certain flow, where the volume of the product is small, or when the product can be tested at higher pressures than its use would require. It is an extremely fast method and, in many cases, does not even require that a test gas source by shut off between operations. Standard cycle times can range from between 0.5 and 2 seconds. In the achieved pressure test, the monitor 2 acts as a fast-acting pressure switch and employs to advantage its ability to operate continuously at high speeds coupled with self-calibrated pressure compensation and a speeded signal reaction. The control orfice 60 connected to the test for the pressure inlet port 12 governs the flow of test fluid through the chamber 3 and is set equal to the expected leakage rate for the vessel under test.

Figure 5:
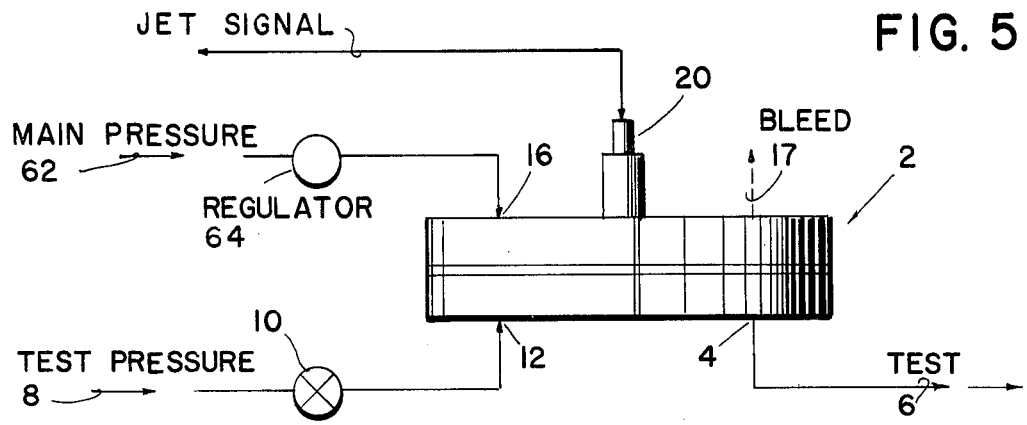
FIG. 5 is a schematic diagram of connections to the monitor for a separate balance pressure test.

When liquid types of fluids are to be used as the test fluid in the lower chamber 3, the separate balance pressure connection for the system shown in FIG. 5 is employed. The balancing pressure must be supplied from a separate source 62 using a balance pressure regulator 64.

Figure 6:
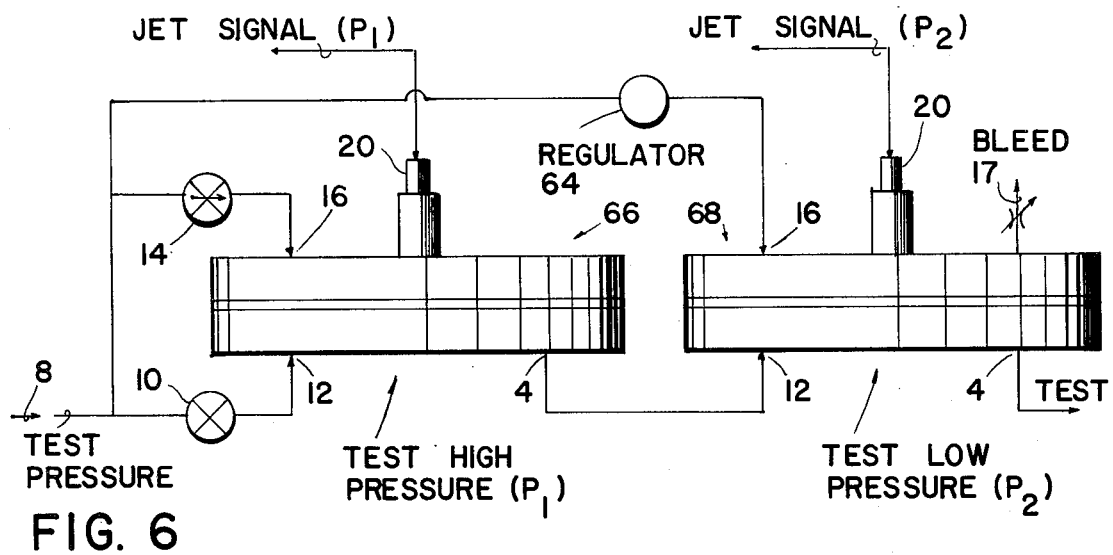
FIG. 6 is a schematic diagram of the connections to two monitors for high-low sensing or control.

Two monitors 2 can be connected for high-low sensing or control as shown in FIG. 6. This type of application is used when an initial jolt pressure is required to seal a test vessel, or where a higher pressure is introduced to compensate for a known leakage in a system, or when the both high and low tests are required. In this case a first monitor 66 is used to determine that a high pressure is achieved and a second monitor 68 is used to indicate that the pressure has dropped according to the expected leakage rate for the vessel.

Figure 7:
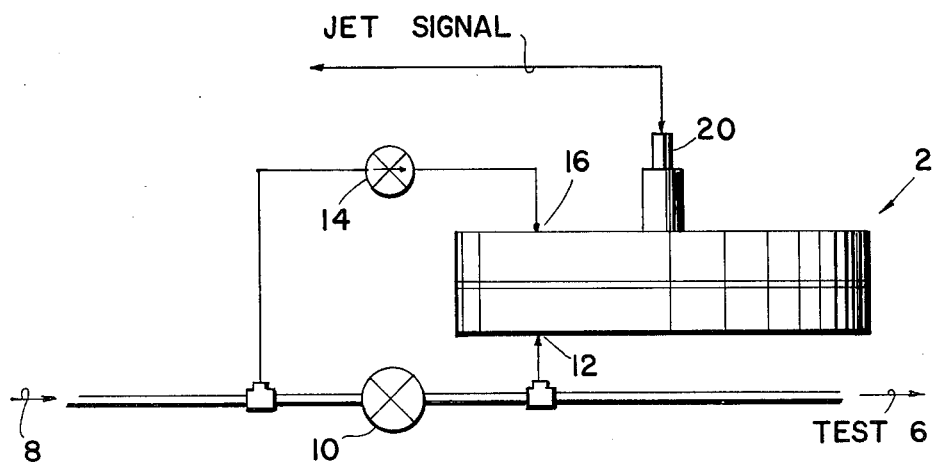
FIG. 7 is a schematic diagram of the connections to the monitor for a large volume pressure testing application.

FIG. 7 illustrates a system connection for high volume applications where it is not practical to fill the pressure vessel through the monitor. In this case the monitor may be connected remotely to the test vessel.

FIGS. 3a through 3d show the pneumatic amplifier portion of the monitor system. The pneumatic amplifier 30 has a body divided into a sensing chamber 28 and a valve portion 52 by a flexible piston 50 therebetween. A sensing gas flow restrictor 40 has an input 41 connected to a sensor regulator 42 as the source of sensing gas for the system. The rate of flow of the sensing gas into the sensing chamber 28 is governed by the pressure applied by the adjustable screw 45 against the ball valve 43 in the input line 41. Sensing gas which enters at a relatively higher pressure at the inlet 41 has its pressure reduced by virtue of the restricted flow around the ball valve 43 so that the sensing gas exits from the restrictor 40 through the outlet 48 into the sensing chamber 28 at a relatively lower pressure. The flexible piston member 50 distends and enlarges the volume of the sensing chamber 28 when the pressure of the sensing gas therein increases. The compression spring 70 will return the flexible piston 50 to a more relaxed state decreasing the volume of the sensing chamber 28 when the pressure of the sensing gas therein decreases.

The valve 52 and a cooperating seat is actuated by a flexing of the piston member 50 in response to pressure changes in the sensing chamber 28. The valve 52 consists of a valve housing 72 having a substantially cylindrical shape with a central axis. A signal gas inlet chamber 74 is connected through the inlet port 51 to the signal gas pressure source 44. A signal gas outlet chamber 76 is connected through the outlet port 53 to the pressure switch 54. A gas vent 80 pneumatically communicates with the inlet chamber 74 and the outlet chamber 76. A first valve seat 82 is situated between the vent 80 and the outlet chamber 76 and a second valve seat 84 is situated between the inlet chamber 74 and the outlet chamber 76.

A first valve 86 is slideably mounted in the valve housing 72 along the axis with a first end 88 in mechanical contact with the flexible piston 50. The compression spring 89 maintains the end 88 of the valve 86 in contact with the flexible piston 50. A second end 90 of the valve 86 is capable of cooperating engagement with the first valve seat 82, for sealing the vent 80 from the outlet chamber 76 when the flexible piston 50 distends and pushes the first valve 86 toward the first valve seat 82.

A second valve 96 is slideably mounted in the valve housing 72 along the axis. The second valve 96 has a first end 98 proximate to but spaced from the second end 94 of the first valve 86 by approximately 0.010 inches. A second end 100 of the second valve 96 is capable of cooperating engagement with the second valve seat 84 for sealing the signal outlet chamber 76 from the signal inlet chamber 74. The second end 100 of the second valve 96 is spring loaded by means of the spring 102 so as to normally engage the second valve seat 84. This condition occurs when the first valve 86 is withdrawn from contacting the first end 98 of the second valve 96. When the pressure in the sensing chamber 28 increases, the first valve 86 is displaced toward the second valve 96. For low level pneumatic noise in the sensing gas pressure at the sensing gas outlet port 26, the second end 98 of the first valve 86 will not be displaced more than 0.010 inches and therefor will not make effective contact with the first end 98 of the second valve 96 due to the 0.010 inch separation therebetween. In this manner, low level noise generated from the gas jet 20 in the monitor 2, for example, can be ignored. However when a true pneumatic signal is received from the gas jet 20 in the monitor 2 by the sensing chamber 28 in the amplifier 30, the second end 94 of a first valve 86 will travel the 0.010 inches and thus will come into effective contact with the first end 98 of the second valve 96 mechanically displacing the second valve 96 and disengaging its second end 100 from second valve seat 84. The second valve 96 being pushed by the first valve, travels 0.005 inches opening the inlet chamber 74 to the outlet chamber 76. The motion of the first valve 86 before contacting the second valve tends to close the vent 80 before the second valve is set into motion. This delayed action in contacting the second valve has the effect of both reducing noise in the output signal and increasing the amount of signal gas entering the outlet 76.

In one embodiment of the invention, a resilient seal 92 is mounted on the second end 90 of the first valve 86 for engaging the first valve seat 82 and sealing the vent 80 from the outlet chamber 76 before the second end 94 of the first valve 86 contacts the first end 98 of the second valve 96. Once an effective seal has been made between the resilient seal 92 and the first valve seat 82, the first valve 86 will engage in a further displacement of approximately 0.005 inches, compressing the resilient seal 92 as the second end 94 of the first valve 86 contacts and displaces the first end 98 of the second valve 96, thereby disengaging the second end 100 of the second valve 96 from its valve seat 84, thereby connecting the inlet port 74 to the outlet port 76. In this manner, a more abrupt rise-time in the pneumatic signal generated in the outlet chamber 76 is achieved due to the first valve having closed off the vent 80 before the second valve 96 is opened, so that the full force of the signal pressure in the inlet chamber 74 can be felt in the outlet chamber 76. The resilient seal 92 may be composed of flexible polyurethane or RTV silicone rubber.

A second embodiment of the invention is that the seal 92 is retracted from the valve seat 82 a greater distance than the second valve 100 from the valve seat 84. This furnishes a larger orifice connecting the outlet chamber 76 to the vent 80 and affords less restriction to the decaying pressure as it exhausts from actuating the pressure switch 54, causing an abrupt reaction of the pressure switch immediately the valve 86 ceases to be actuated by the piston member 50.

Figure 8:
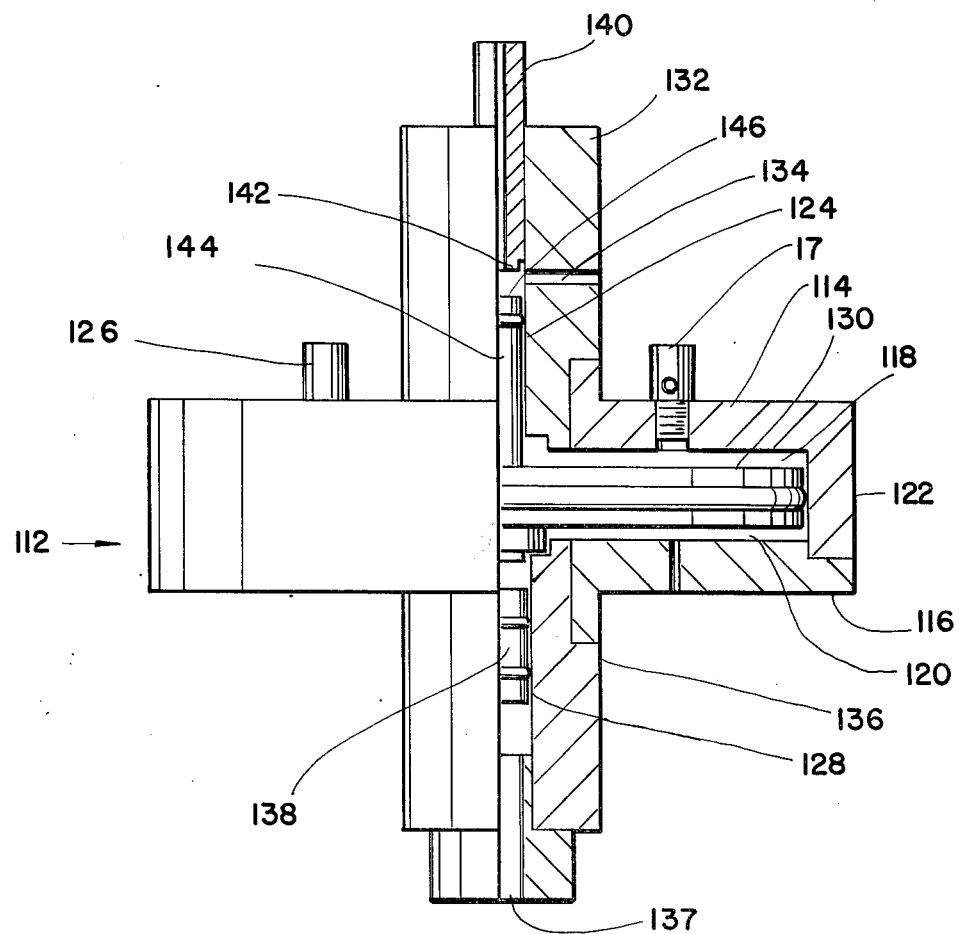
FIG. 8 is another embodiment of the monitor suitable for high pressure testing.
Figure 3C:
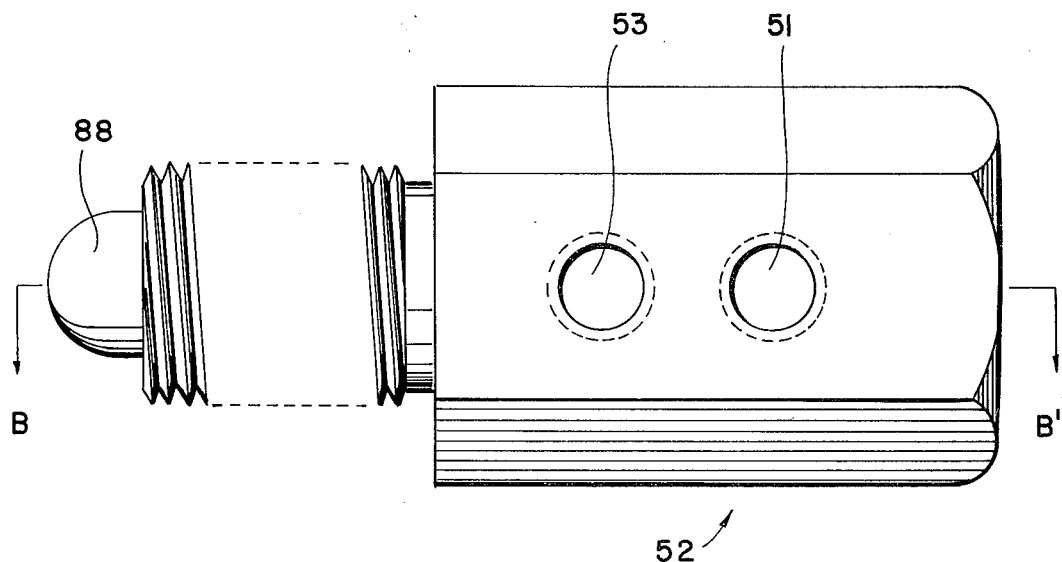
FIG. 3c is a view of the valve housing for the amplifier of FIG. 3b.
Figure 3D:
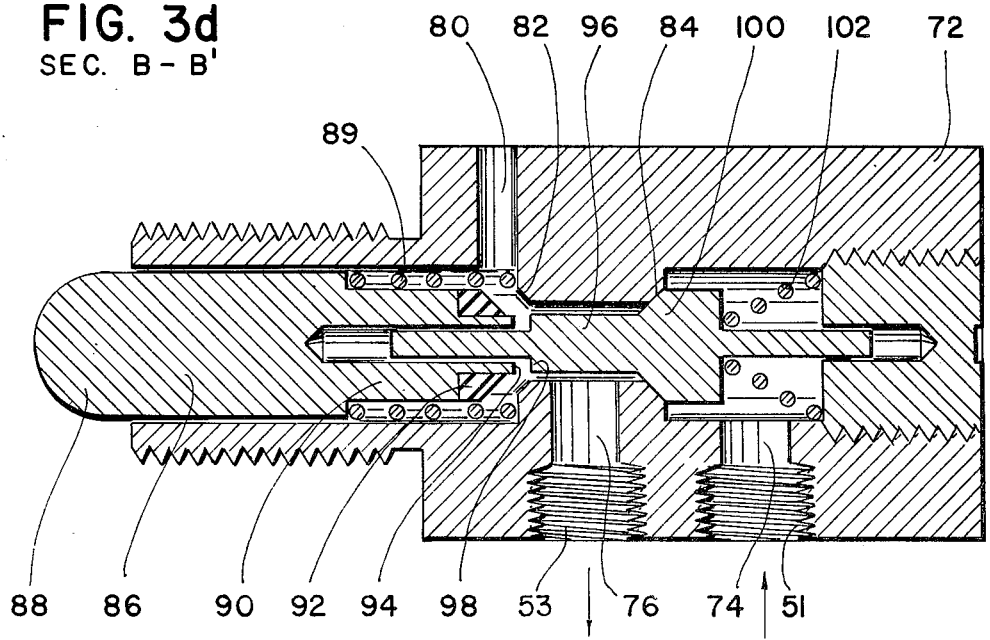
FIG. 3d is a cross sectional view along the section B-B' of the valve housing shown in FIG. 3c.

FIG. 8 illustrates another embodiment of the monitor, which has the differential piston area in favor of the balancing side of the piston so that the balancing pressure is lower than the test pressure, permitting normal shop air pressures to be used for balancing test pressures of considerably greater magnitudes. The high pressure monitor of FIG. 8 includes a housing 112 having an upper member 114 and a lower member 116 which are substantially circular in shape with central portion 118 for the upper member and 120 for the lower member which are hollow on their proximate sides forming a cylindrical wall portion 122 therebetween. The upper housing member 114 has a first central hole 124 therethrough coaxial with the circular shape and a balance fluid pressure port 126 connected to a source of reference gas pressure. The lower housing portion 116 has a central hole 128 therethrough coaxial with the circular shape.

A first piston 130 is slideably mounted within the cylindrical wall 122 of the housing 112 dividing the housing into an upper chamber 118 within the upper member 114 and a lower chamber 120 within the lower member 116. The upper chamber 118 communicates with a balance gas pressure port 126.

A first hollow barrel member 132 is mounted on the outside of the upper housing 114 coaxial with the first central hole 124 therethrough. The first hollow barrel member 132 has a gas exit port 134 in its side.

A second hollow barrel member 136 is mounted on the outside of the lower housing member 116 coaxial with the second central hole 128 therethrough. The second hollow barrel member 136 has a test fluid pressure port 137 connected to a source of high pressure fluid to be monitored.

A second piston 138 is slideably mounted within the second hollow barrel member 136 between the test fluid pressure port 137 and the first piston 130 and in mechanical contact with the first piston 130. The second piston 138 has a cross sectional area less than that of the first piston 130 as exposed in the upper chamber 118.

A gas jet tube 140 is mounted in the first hollow barrel member 132 and coaxially with the first central hole 124. The gas jet tube 140 is connected to a source of sensing gas pressure detector 54. The gas jet tube 140 has a gas outlet 142 on a planar surface proximate to the gas exit port 134 in the barrel 132.

A third piston 144 is mounted coaxially on the first piston 130 and in sliding engagement with the first central hole 124 in the upper housing member 114. The third piston 144 has an upper planar surface 146 which mates with and forms a gas seal with the planar surface 142 of the gas outlet in the gas jet tube 140. In this manner a first state sensing gas pressure signal can be generated for detection by the detector 54 when the fluid pressure to be monitored approximately equals the reference pressure times the ratio of the cross sectional area of the first piston 130 to the cross sectional area of the second piston 138. The upper planar surface 146 of the third piston 144 will break the gas seal with the gas jet tube 140 and thereby generate a second state sensing gas pressure signal for detection by the detector 54 when the fluid pressure to be monitored is less than the reference pressure times the ratio of the cross sectional area of the first piston 130 to the cross sectional area of the second piston 138.

The area of the balancing piston 130 is preferred to be approximately 100 times greater than the cross sectional area of the test piston 138, and therefore a test pressure of 1,000 psig is balanced by a pressure of 10 psig. The preferred monitor of FIG. 8 is limited to approximately 3,000 psig test pressure but its structure can be strengthened to withstand pressures up to 10,000 psig.

The monitor of FIG. 8 requires a pressure differential of approximately 1 psig to function. The volumetric displacement for signal initiation is approximately 0.0166 ccs. When used for conventional pressure or leak testing, the monitor of FIG. 8 uses the same connections as are shown in FIG. 5. The differential piston areas in the monitor of FIG. 8 may also be used to amplify the test pressure. When the testing medium is a liquid, the vessel and the monitor of FIG. 8 are charged with the liquid at a normal pressure. Balancing during the filling operation is sufficient to prevent movement of the piston 130 only when the system is filled, but after the charged valve is closed, the balancing pressure is increased to amplify the test pressure to the degree required. The use of a high pressure monitor such as that of FIG. 8 eliminates the need for high pressure pumps, valves, and fittings except in the immediate test area and will provide a considerable savings over conventional testing techniques. An important feature is the safety factor for the monitor of FIG. 8 which has a limited displacement for its operating parts if a rupture were to occur in the test unit.

Although specific examples of the invention have been shown to illustrate the principle of the invention, it will be understood by those of skill in the art that changes may be made in the structure of the illustrative embodiments without departing from the spirit and scope of the invention.

I claim:
1. A fluid pressure monitor, comprising:
an axially displaceable piston means having a first surface exposed to a fluid pressure to be monitored and a second surface opposite to said first surface, having a first portion exposed to a reference gas pressure and a second portion not so exposed;
a gas jet having an inlet connected to a sensing gas pressure source and sensing gas pressure detector and an outlet proximate to said second portion of said second surface of said piston means:
whereby changes in the relative magnitude of said fluid pressure to be monitored with respect to said reference pressure, will cause said piston means to alternately block and unblock said outlet of said gas jet, producing a pneumatic signal detectible by said detector.

2. The monitor of claim 1, wherein:
said first surface of said piston means has a greater cross sectional area than that of said first portion of said second surface thereof;
whereby said gas jet will be blocked when said reference pressure is approxiamtely equal to said fluid pressure to be detected.

3. The monitor of claim 2, wherein:
said first surface of said piston means is connected to a source of said gas pressure to be monitored and said reference pressure is made approximately equal to the magnitude of said pressure to be monitored at a first time;
whereby a reduction in pressure in said source of pressure can be detected by said piston means unblocking said gas jet at a time subsequent to said first time.

4. The monitor of claim 3, wherein said reduction in pressure in said source of gas pressure represents a gas pressure leak.

5. The monitor of claim 2, wherein:
said first surface of said piston means if fluid-connected to a fluid pressure chamber to be monitored which is to be charged with a fluid pressure after a first time and said reference gas pressure is made greater than the magnitude of the fluid pressure in said chamber at said first time;
whereby the achievement of an increase in the fluid pressure in said chamber to a magnitude approximately equal to said reference gas pressure will be detected by said piston means blocking said gas jet at a time subsequent to said first time.

6. The monitor of claim 2, wherein said piston means further comprises:
a diaphragm mounted in a cylindrical body, supporting a striker proximate to said gas jet.

7. The monitor of claim 1, wherein:
said first surface of said piston means has a smaller cross sectional area than that of said first portion of said second surface thereof;
whereby said gas jet will be blocked when said fluid pressure to be monitored is greater than said reference gas pressure times the ratio of the cross sectional area of said first portion of said second surface of said piston means to that of said first surface thereof.

8. The monitor of claim 7, wherein said piston means further comprises:
a first piston slideably mounted in a cylindrical body, supporting a striker proximate to said gas jet outlet;
a second piston slideably mounted in said body in mechanical contact with and having a smaller cross sectional area than said first piston, located between said first piston and said fluid pressure to be monitored.

9. The fluid pressure monitor of claim 1, wherein said sensing gas pressure source further comprises:
a sensing gas flow restrictor having an inlet connected to a pressurized source of gas, and an outlet through which the sensing gas is emitted;
a sensing chamber having an inlet connected to said outlet of said flow restrictor, with one wall thereof formed by a flexible piston, and an outlet.

10. The fluid pressure monitor of claim 9, wherein said sensing gas pressure detector further comprises:
a valve housing mounted proximate to said flexible piston, having a signal gas oulet chamber connected to a gas pressure signal detector, a gas vent separated from said outlet chamber by a first valve seat, and a signal gas inlet chamber connected to a signal gas pressure source and separated from said outlet chamber by a second valve seat;
a first valve in said valve housing, having a first end in mechanical contact with said flexible piston and a second end in cooperating engagement with said first valve seat, for sealing said vent from said outlet chamber when said flexible piston is distended with an increasing sensing gas pressure in said sensing chamber;
a second valve in said valve housing, in mechanical contact with said second end of said first valve and in cooperating springloaded engagement with said second valve seat, for sealing said signal outlet chamber from said signal inlet chamber when said first valve is not engaged in said first seat, said second end of said first valve mechanically displacing said second valve from said second valve seat when said first valve engages said first valve seat, said signal gas pressure in said inlet chamber abruptly passing around said second valve and into said outlet chamber which is sealed from said vent by said first valve, thereby generating a fast risetime pneumatic signal in said outlet chamber;
whereby rapid changes in said fluid pressure to be monitored can be detected.

11. The fluid pressure monitor of claim 10, wherein said first valve further comprises:
a resilient seal mounted on said second end of said first valve for engaging said first valve seat and sealing said vent from said outlet chamber before said second end of said first valve contacts said second valve;
said resilient seal being compressed as said first valve mechanically displaces said second valve;
whereby a more abrupt rise-time in the pneumatic signal generated in said outlet chamber is achieved due to said vent being closed before said second valve is opened, and whereby the seal on the second end of the first valve is retracted a greater distance from the said first valve seat than the distance moved by the second valve, thus providing a larger orifice for exhausting gas pressure than for introducing said pressure.

12. A system for monitoring fluid pressure, comprising:
a sensing gas flow restrictor having an inlet connected to a pressurized source of gas, and an outlet through which the sensing gas is emitted;
a sensing chamber having an inlet connected to said outlet of said flow restrictor, with one wall thereof formed by a flexible piston, and an outlet;
a jet tube mounted over a hole in the upper chamber of a two chamber housing, having an inlet connected to said outlet of said sensing chamber and an outlet facing the interior of said housing and venting said sensing gas to the ambient;
said housing having said upper and a lower chamber separated by a flexible diaphragm having a smaller surface area exposed to said upper chamber than is exposed to said lower chamber, with said upper chamber connected to a reference gas pressure and said lower chamber connected to the fluid pressure to be monitored, with a striker portion of said diaphragm extending through said hole in said upper chamber and abuts said outlet of said jet tube when said monitored fluid pressure approximately equals said reference gas pressure, stopping the flow of said sensing gas through said jet tube and through said sensing chamber, thereby increasing the pressure of said sensing gas in said sensing chamber, distending said flexible piston;

a valve housing mounted proximate to said flexible piston, having a signal gas outlet chamber connected to a gas pressure signal detector, a gas vent separated from said outlet chamber by a first valve seat, and a signal gas inlet chamber connected to a signal gas pressure source and separated from said outlet chamber by a second valve seat;

a first valve in said valve housing, having a first end in mechanical contact with said flexible piston and a second end in cooperating engagement with said first valve seat, for sealing said vent from said outlet chamber when said flexible piston is distended with an increasing sensing gas pressure in said sensing chamber;

a second valve in said valve housing, in mechanical contact with said second end of said first valve and in cooperating springloaded engagement with said second valve seat, for sealing said signal outlet chamber from said signal inlet chamber when said first valve is not engaged in said first seat, said second end of said first valve mechanically displacing said second valve from said second valve seat when said first valve engages said first valve seat, said signal gas pressure in said inlet chamber abruptly passing around said second valve and into said outlet chamber which is sealed from said vent by said first valve, thereby generating a fast rise and fall time pneumatic signal in said outlet chamber;

whereby rapid changes in said fluid pressure to be monitored can be detected.

13. The system of claim 12, wherein said first valve further comprises:

a resilient seal mounted on said second end of said first valve for engaging said first valve seat and sealing said vent from said outlet chamber before said second end of said first valve contacts said second valve;

said resilient seal being compressed as said first valve mechanically displaces said second valve;

whereby a more abrupt rise-time in the pneumatic signal generated in said outlet chamber is achieved due to said vent being closed before said second valve is opened, and whereby a more abrupt discontinuation of the signal is realized when a drop occurs in the monitored pressure due to the rapid exhausting of the signal.

14. A fluid pressure monitor, comprising:

a housing having upper and lower members which are substantially circular in shape with a central portion on a first side of each being hollow, said upper housing member having a central hole therethrough coaxial with said circular shape and a balance fluid pressure port connected to a source of reference gas pressure, said lower housing member having a test fluid pressure port connected to a source of fluid pressure to be monitored;

a substantially circular diaphragm clamped around its periphery between said first sides of said upper and lower housing members forming an upper fluid chamber with said upper housing member and a lower fluid chamber with said lower housing member, and having a smaller portion of its upper surface area exposed to said reference gas pressure in said upper chamber than its lower surface area exposed to said monitored fluid pressure in said lower chamber;

a hollow barrel member mounted on a second side of said upper housing member opposite to said first side thereof and coaxially with said central hole, having a gas exit port in its side;

a gas jet tube mounted in said hollow barrel member and coaxially with said central hole, having a gas jet port connected to a source of sensing gas pressure and a sensing gas pressure detector with a gas outlet on a planar surface thereof proximate to said gas exit port in said barrel;

a piston mounted coaxially on said diaphragm in sliding engagement with said central hole of said upper housing member, with an upper planar surface which mates with and forms a gas seal with said planar surface of said gas outlet of said gas jet port thereby generating a first state sensing gas pressure signal for detection by said detector when said fluid pressure to be monitored in said lower fluid chamber approximately equals said reference gas pressure in said upper chamber, said upper planar surface of said piston being displaced from said planar surface of said gas jet port breaking said gas seal therewith thereby generating a second state sensing gas pressure signal for detection by said detector when said fluid pressure to be monitored in said lower fluid chamber is less than said reference gas pressure in said upper chamber.

15. In a pneumatic amplifier having a body divided into a sensing chamber and a valve chamber by a flexible piston member therebetween, with the sensing chamber having an inlet connected to a source of sensing gas pressure and an outlet connected to a sensing gas jet having a jet port whose state of blockage is to be sensed, the amplifier having a valve and cooperating seat actuated by the flexing of the piston member in response to pressure differentials between the sensing chamber and the valve chamber, wherein said valve comprises:

a valve housing having a substantially cylindrical shape with a central axis a signal gas inlet chamber connected to a signal gas pressure source, a signal gas outlet chamber connected to a gas pressure signal detector, and a gas vent pneumatically communicating with one another along said axis, with a first valve seat between said vent and said outlet chamber and a second valve seat between said inlet chamber and said outlet chamber;

a first valve slideably mounted in said valve housing along said axis, with a first end in mechanical contact with said flexible piston and a second end in cooperating engagement with said first valve seat, for sealing said vent from said outlet chamber when said flexible piston pushes said first valve toward said first valve seat;

a second valve slideably mounted in said valve housing along said axis with a first end proximate to but spaced from said second end of said first valve and a second end in cooperating engagement with said second valve seat, said second end of said second valve being spring loaded to engage said second seat sealing said signal outlet chamber from said signal inlet chamber when said first valve is not engaged in said first seat, said first end of said second valve mechanically abutting said second end of said first valve when said first valve engages said first seat, mechanically displacing said second valve and disengaging said second valve from said second valve seat, said signal gas pressure in said inlet chamber abruptly passing around said second end of said second valve and into said outlet chamber which is sealed from said vent by said first valve;

whereby said first valve will not cause an output signal from said outlet chamber for low level noise pressure fluctuations in said sensing chamber but will cause an abrupt output signal from said outlet chamber when the pressure in said sensing chamber is high enough to seal said first valve on said first valve seat and displace said second valve from said second valve seat, and whereby the signal is abruptly discontinued by rapidly exhausting the signal gas pressure immediately pressure in the sensing chamber is insufficient to maintain a seal on the first valve seat.

16. The pneumatic amplifier of claim 15, wherein said first valve further comprises:

a resilient seal mounted on said second end of said first valve for engaging said first valve seat and sealing said vent from said outlet chamber before said second end of said first valve contacts said second valve;

said resilient seal being compressed as said first valve mechanically displaces said second valve;

whereby a more abrupt rise-time in the pneumatic signal generated in said outlet chamber is achieved due to said vent being closed before said second valve is opened, and whereby the signal is abruptly discontinued by rapidly exhausting the signal gas pressure immediately pressure in the sensing chamber is insufficient to maintain a seal on the first valve seat.

17. A high fluid pressure monitor, comprising:

a housing having upper and lower members which are substantially circular in shape with a central portion on a first side of each being hollow forming a cylindrical wall portion therebetween, said upper housing member having a first central hole therethrough coaxial with said circular shape and a balance fluid pressure port connected to a source of reference gas pressure, said lower housing portion having a second central hole therethrough coaxial with said circular shape;

a first piston slideably mounted within said cylindrical wall portion of said housing dividing said housing into an upper chamber within said upper member and a lower chamber within said lower member, said upper chamber communicating with said balance fluid pressure port;

a first hollow barrel member mounted on a second side of said upper housing member opposite to said first side thereof and coaxially with said first central hole therethrough, having a gas exit port in its side;

a second hollow barrel member mounted on a second side of said lower housing member opposite to said first side thereof and coaxially with said second central hole therethrough, having a test fluid pressure port connected to a source of high pressure fluid to be monitored;

a second piston slideably mounted within said hollow barrel between said test fluid pressure port and said first piston and in mechanical contact therewith, having a cross sectional area less than that of said first piston exposed to said upper chamber;

a gas jet tube mounted in said first hollow barrel member and coaxially with said first central hole, having a gas jet connected to a source of sensing gas pressure and a sensing gas pressure detector, with a gas outlet on a planar surface thereof proximate to said gas exit port in said barrel;

a third piston mounted coaxially on said first piston and in sliding engagement with said first central hole of said upper housing member, with an upper planar surface which mates with and forms a gas seal with said planar surface of said gas outlet of said gas jet port, thereby generating a first state sensing gas pressure signal for detection by said detector when said fluid pressure to be monitored approximately equals said reference fluid pressure times the ratio of the cross sectional area of said first piston to that of said second piston, said upper planar surface of said third piston breaking said gas seal with said gas jet tube thereby generating a second state sensing gas pressure signal for detection by said detector when said fluid pressure to be monitored is less than said reference gas pressure times the ratio of the cross sectional area of said first piston to that of said second piston.

* * * * *